United States Patent [19]

Garvey et al.

[11] Patent Number: 4,725,629

[45] Date of Patent: Feb. 16, 1988

[54] PROCESS OF MAKING AN INTERPENETRATING SUPERABSORBENT POLYURETHANE FOAM

[75] Inventors: Chad E. Garvey, Ball Ground; Jose F. Pazos, Roswell, both of Ga.

[73] Assignee: Kimberly-Clark Corporation, Neenah, Wis.

[21] Appl. No.: 888,301

[22] Filed: Jul. 18, 1986

[51] Int. Cl.$^4$ .................. C08L 75/00; C08G 18/10; C08G 18/67

[52] U.S. Cl. .................. 521/137; 521/905; 528/66; 528/75

[58] Field of Search .................. 521/137, 905; 528/66, 528/75

[56] References Cited

U.S. PATENT DOCUMENTS

| | | | |
|---|---|---|---|
| 2,920,983 | 1/1960 | Bugosh | 521/905 |
| 2,990,378 | 6/1961 | Hurwitz et al. | 521/905 |
| 3,382,090 | 5/1968 | Meisel et al. | 521/905 |
| 3,860,537 | 1/1975 | Graham et al. | 521/137 |
| 4,332,716 | 6/1982 | Shah | 521/137 |
| 4,359,558 | 10/1982 | Gould et al. | 521/905 |

*Primary Examiner*—Harold D. Anderson
*Assistant Examiner*—Dennis R. Daley
*Attorney, Agent, or Firm*—William E. Maycock

[57] ABSTRACT

A superabsorbent polyurethane foam based on an interpenetrating polymer network of a crosslinked polyurethane and a crosslinked addition polymer containing a plurality of chain segments made up of functional group-containing repeating units which may be the same or different. The functional groups of the repeating units are selected from the group consisting of carbamoyl, substituted carbamoyl, and carboxy and the alkali metal and ammonium salts thereof. A method of preparing the foams is described which involves forming the polyurethane foam in the presence of addition polymerizable monomers and crosslinking agent and a thermally activated free radical initiator. Addition polymerization can take place during or after foam formation. Reactants and reaction conditions are selected so as to essentially avoid grafting addition polymer to polyurethane.

Preferably, the polyurethane is derived from an isocyanate-terminated poly(oxyalkylene) polyol having an isocyanate functionality greater than two and the addition polymer is the reaction product of a crosslinking agent, such as methylene-bis-acrylamide and 1,6-hexanediol diacrylate, with at least one compound selected from the group consisting of acrylamides, substituted acrylamides, and acrylate and methacrylate salts, i.e., alkali metal and ammonium salts of acrylic and methacrylic acid.

Such superabsorbent polyurethane foam is useful in the manufacture of absorbent articles, especially disposable absorbent articles such as diapers, sanitary napkins, bedpads, incontinent pads, and the like.

7 Claims, No Drawings

PROCESS OF MAKING AN INTERPENETRATING SUPERABSORBENT POLYURETHANE FOAM

CROSS-REFERENCES TO RELATED APPLICATIONS

A superabsorbent polyurethane foam containing a plurality of polycarbonyl moieties covalently attached to the polyurethane through at least one urethane, thiourethane, or urea linkage, said polycarbonyl moieties comprising from about 5 to about 100 carbonyl-containing repeating units, the carbonyl portions being independently selected from the group consisting of carbamoyl, substituted carbamoyl, and carboxy and alkali metal and ammonium salts thereof, is described in application Ser. No. 888,545, entitled Superabsorbent Polyurethane Foams, filed of even date in the names of Chad E. Garvey, Jose F. Pazos, and Gerard J. F. Ring and assigned to the assignee of the present application.

A superabsorbent polyurethane foam based on a quasi-interpenetrating polymer network of a crosslinked polyurethane and a substantially linear addition polymer containing a plurality of carbamoyl, substituted carbamoyl, or carboxy groups or the alkali metal or ammonium salts thereof, is described in application Ser. No. 888,548, entitled Superabsorbent Polyurethane Foams, filed of even date in the name of Chad E. Garvey and assigned to the assignee of the present application.

BACKGROUND OF THE INVENTION

The present invention relates to polyurethane foams. More particularly, the present invention relates to polyurethane foams having greatly enhanced absorbent capabilities, i.e., superabsorbent polyurethane foams, which are based on interpenetrating polymer networks.

Polyurethane foams are, of course, well known to those having ordinary skill in the art. Indeed, a voluminous body of literature has accumulated over the years as researchers explored combinations of starting materials and correlated starting materials with foam properties. Moreover, numerous efforts have been made to either modify the physical properties of polyurethane foams or to prepare specialized polyurethane foams having unique properties. A particularly sought-after property is increased water absorbency. Polymers having this property often are referred to as hydrogels or superabsorbents.

The nature and utility of superabsorbents are illustrated by U.S. Pat. No. 4,449,977, although it will be appreciated by those having ordinary skill in the art that numerous other references also could be cited. According to this reference, an apparently desirable feature of a superabsorbent is the presence of acrylate or methacrylate groups which can be salts, amides, esters, or the free acids.

As a practical matter, many hydrogels are based on acrylate and methacrylate polymers and copolymers. See, by way of example only, U.S. Pat. Nos. 2,976,576, 3,220,960, 3,993,616, 4,154,898, 4,167,464 4,192,727, 4,192,827, and 4,529,739. The last-cited patent is of particular interest since the disclosed water-absorbent polymers are foamed. Other hydrogels are based on starch or a modified starch, as shown by U.S. Pat. Nos. 4,069,177, 4,076,663, 4,115,332, and 4,117,222. Still other hydrogels are based on poly(oxyalkylene) glycols; see, e.g., U.S. Pat. No. 3,783,872. Hydrogels prepared from hydrolyzed crosslinked polyacrylamides and crosslinked sulfonated polystyrenes are described in U.S. Pat. No. 4,235,237. Finally, polymers based on maleic anhydride (or similar compounds) have been described in U.S. Pat. Nos. 2,988,539, 3,393,168, 3,514,419, 3,557,067, and 4,401,793. U.S. Pat. No. 3,900,378 is of interest since it describes hydrogels from radiation crosslinked blends of hydrophilic polymers and fillers, many of the polymers being those described in the foregoing patents. However, such materials are not necessarily well suited for the uses described in U.S. Pat. No. 4,449,977, supra.

Polyurethane hydrogels are, of course, known and frequently are based on the reaction of a poly(oxyalkylene) polyol with a diisocyanate. However, relatively few of such hydrogels contain acrylate or methacrylate moieties, or even carboxylate groups. Examples of carboxylate-containing polyurethanes and polyurethane hydrogels are noted below.

U.S. Pat. No. 3,928,299 describes the reaction of a hydroxy group-containing polymer with an unsaturated isocyanate. Suitable hydroxy group-containing polymers can be obtained by the polymerization of hydroxyalkyl esters of acrylic acid or alpha-alkyl-substituted acrylic acids or by the copolymerization of these compounds with other vinyl or vinylidene compounds. Suitable hydroxyalkyl esters are the monoesters of the foregoing acids with ethylene glycol, propylene glycol, propane-1,3-diol, butanediol, diethylene glycol, and higher polyethylene glycols. Such polymers also can be polyesters of polybasic aliphatic or aromatic carboxylic acids with polyhydric alcohols, polyurethanes which contain hydroxy groups, or epoxy resins which contain hydroxy groups. The resulting polymers are crosslinkable by vinyl polymerization and are useful for the preparation of coatings and molded products. Foams, especially polyurethane foams, are not mentioned. See also U.S. Pat. No. 4,210,713.

Disclosures similar to that of the above patent are found in U.S. Pat. Nos. 3,871,908, 3,856,830, 3,054,714, and 4,082,710.

U.S. Pat. No. 4,131,602 describes radiation-curable acrylated polyurethane coating compositions. The compositions are prepared by reacting an isocyanate-terminated urethane intermediate with an amount of a hydroxyalkyl, hydroxycycloalkyl, or hydroxyaryl ester of acrylic acid or methacrylic acid which is sufficient to react with at least 80 percent of the isocyanate groups of the urethane intermediate. The urethane intermediate is the reaction product of an organic diisocyanate, an organic triol or tetraol which is either a polyester or a polyether, and an organic diol which is either a polyester or a polyether. The diisocyanate is used in an equivalent excess to the other two components. In addition, when the triol or tetraol is polyester, the diol must be a polyether, and when the triol or tetraol is a polyether, the diol must be a polyester.

U.S. Pat. No. 4,153,778 describes acrylyl-capped urethane oligomers which readily cure by thermal or radiation means and are useful as coatings, binders, and adhesives. The oligomers are the reaction products of a poly(oxytetramethylene) diol or a polycaprolactone polyol, an organic diisocyanate, a di- or trimethylol carboxylic acid, and an acrylyl compound.

Polyester urethane-containing molding compositions are described in U.S. Pat. No. 4,287,116. Briefly, an ethylenically unsaturated monomer solution having dissolved therein a polyester urethane resin and an organic polyol polyurethane precursor is gelled by the addition of a polyisocyanate polyurethane precursor. The gelled mixture then is molded and cured by copolymerization of the ethylenically unsaturated monomer and the resin. The resin typically is a condensation product of a dihydroxy-terminated poly(oxyalkylene) bisphenol A maleate or fumarate and a polyisocyanate which is further reacted with a hydroxy-terminated ester of acrylic or methacrylic acid. The polyol precursor is a saturated aliphatic polyol or alkoxylated derivative thereof. The ethylenically unsaturated monomer can be, by way of illustration, styrene, vinyltoluene, divinylbenzene, esters of acrylic or methacrylic acid, vinyl acetate, divinyl ether, and the like. Finally, the polyisocyanate precursor is an aliphatic, cycloaliphatic or aromatic compound having at least two isocyanate groups.

U.S. Pat. No. 4,480,079 discloses molded plastic products which are produced by the in-mold copolymerization of methyl methacrylate with a polyurethane acrylate or methacrylate. The latter material is derived from a hydroxyalkyl acrylate or methacrylate by reaction of the hydroxy groups thereof with the isocyanate groups of either a polyisocyanate free of urethane groups and having an isocyanate functionality greater than two or a urethane polyisocyanate having an isocyanate functionality greater than two and derived from a polyisocyanate by reaction thereof with the hydroxy groups of an aliphatic alcohol having up to three hydroxy groups.

A series of ten patents relates to polyurethane polyene or diacrylate polymers. These ten patents, discussed briefly below, appear to relate to interpenetrating polymer networks, although such terminology does not appear to have been applied to the polymer compositions described by these references. For general discussions of interpenetrating polymer networks, see, by way of example only, D. Klempner et al., *J. Elastoplastics,* 5, 196 (1973); A. A. Donatelli et al., *Macromolecules,* 9, 671 and 676 (1976); L. H. Sperling et al., *Macromolecules,* 9, 743 (1976); L. H. Sperling, *J. Polymer Science,* 12, 141 (1977); and D. L. Siegrfied et al., *J. Polymer Science,* 16, 583 (1978).

U.S. Pat. No. 4,359,558 discloses hydrophilic polyurethane diacrylate composition. The compositions, which form hydrogels upon immersion in water, are prepared by reacting a diacrylate in the presence of a hydrophilic polyurethane. A free radical initiator may be present. The polurethane typically is the reaction product of one or more diols having a number average molecular weight in the range of from about 200 to about 20,000, selected from the group consisting of ethylene glycol and long chain poly(oxyalkylene) diols, with a urethane precursor selected from the group consisting of organic polyisocyanates and nitrile carbonates in the presence of an organic tin catalyst. Optionally, a polyfunctional lactone also may be present in amounts of from 0.1 to 30 percent by weight, based on the weight of the total reaction mixture. The long chain diols typically are the condensation products of either ethylene oxide or propylene oxide. The diacrylate may be prepared by reacting acrylic acid chloride (propenoyl chloride) or methacrylic acid chloride (2-methylpropenoyl chloride) with a glycol such as ethylene glycol or a condensation product of either ethylene oxide or propylene oxide. The two components are dissolved in a suitable solvent, cast as a film, and cured by heat or ultraviolet radiation. See also U.S. Pat. Nos. 4,408,023, 4,424,305, 4,439,583, 4,439,584, and 4,439,585.

Hydrophilic polyurethane acrylate compositions are disclosed in U.K. Patent Application GB No. 2,150,938A. The disclosure is similar to that of U.S. Pat. Nos. 4,359,558 et al., except that the diacrylate is replaced with an acrylate which is the monoacrylic or monomethacrylic ester of an alcohol having less than 13 carbon atoms. The preferred acrylates are stated to be hydroxyethyl acrylate, methyl methacrylate, and methyl acrylate. The polyurethane and acrylate components are dissolved in a solvent, optionally in the presence of a free radical initiator, cast as a film, and cured thermally or by ultraviolet radiation. Shaped articles can be made by removing the solvent under reduced pressure, molding the residual mixture, and curing the molded article thermally.

Hydrophilic polyurethane polyene compositions are disclosed in U.S. Pat. No. 4,454,309. The compositions are prepared by reacting a polyene in the presence of a hydrophilic polyurethane. The polyene is either a polyallyl ester of a polybasic acid or a polyacrylic or polymethacrylic ester of a polyhydric alcohol. The polyurethane is that described in U.S. Pat. No. 4,359,558. As with the compositions of such earlier patent, the components are dissolved in a suitable solvent, cast as a film, and cured with heat or ultraviolet radiation. Alternatively, the solvent may be removed under reduced pressure and the residual mixture molded and cured thermally. See also U.S. Pat. Nos. 4,490,423 and 4,496,535.

In each of the foregoing references, the unsaturated monomers are polymerized in the presence of an existing polymer, i.e., a polyurethane. A similar approach is disclosed in U.S. Pat. No. 4,551,486. According to the patent, hardenable dental compositions are prepared by polymerizing crosslinking oligomers in the presence of a crosslinked polymer and one or more of a filler, an initiator, and a monofunctional monomer. The crosslinked polymer can be a polurethane, although the preferred polymers are derived from aliphatic, cycloaliphatic, phenyl, and substituted phenyl esters of acrylic acid and homologs thereof. The crosslinking agents which are useful in the preparation of the crosslinked polymer can be selected from a wide variety of polyfunctional materials. The preferred functionality apparently is an ethylenic function, presumably because the preferred polymers are prepared by the addition polymerization of unsaturated monomers. The crosslinking oligomers also tend to be polyunsaturated compounds, such as acrylic and lower alkyl acrylic acid diesters, acrylic and lower acrylic acid esters of alcohols having a second reactive function, urethane diacrylates and dimethacrylates, polyvinyl compounds, divinyl aromatic compounds, and the like. Preferred compounds include allyl acrylate, allyl methacrylate, vinyl acrylate, vinyl methacrylate, dimethallyl fumarate, N-allylacrylamide, crotyl acrylate, ally crotonate, allyl cinnamate, diallyl maleate, acrylate and methacrylate esters of polyols, and the like.

The reverse approach is described in European Patent Application No. 85105252.2, published as 0,163,150. In general, a polyurethane foam is prepared in the presence of a polyelectrolyte polymer. Preferably, the polyurethane is prepared from an isocyanate-terminated poly(oxyalkylene) polyol, such as the HYPOL® precursors sold by W. R. Grace & Co. The crosslinking agents are selected to react with the carboxylic acid groups of the polyelectrolyte polymer and include polyhaloalkanols, haloepoxyalkenes, polyglycidyl ethers, defined di- and triaziridines, and the like. The polyelectrolyte polymers tend to be polymers or copolymers of acrylic and methacrylic acid with such monomers as acrylates, methacrylates, acrylamide, olefins, vinyl aromatic compounds, styrenesulfonic acid, vinyl ethers, vinyl acetate, vinyl alcohol, maleic acid, fumaric acid, and the like. The examples used a polyacrylic acid which had been treated with sodium hydroxide.

It perhaps should be noted at this point that interpenetrating polymer networks ideally do not include any grafting of the first polymer to the second, although, as noted by Donatelli et al., some grafting may take place accidentally. Because of the selection of polymer types described in the foregoing interpenetrating polymer network references, little, if any, grafting should have taken place.

Acrylic monomers containing carbamate (urethane) functionality are described in U.S. Pat. Nos. 3,297,745, 3,425,988, 4,129,667 and 4,279,833. An acrylic monomer containing isocyanate functionality, isocyanatoethyl methacrylate, is described in *Adhesives Age*, October, 1984. The article summarizes three areas in which isocyanatoethyl methacrylate has been used: (1) applications where the methacrylate group is polymerized first, leaving the isocyanate group for a later reaction, (2) applications where the isocyanate group is reacted with a polyfunctional material first, leaving the vinyl group for a later reaction, and (3) applications where the isocyanate group is reacted with a monofunctional reagent first to make a new monomer which can be polymerized later.

Because a significant amount of the voluminous polyurethane foam literature relates to the use as a starting material of what may be termed polyether polyols, polyglycolethers, or poly(oxyalkylene) polyols and such starting material has acquired a singularly important status in the polyurethane art, a discussion of representative references relating thereto is deemed necessary for the sake of completeness.

One of the earliest references describing such materials is U.S. Pat. No. 2,948,691. According to this patent, polyglycolethers having a molecular weight of at least 500 and at least two terminal hydroxy groups can be reacted with mono- or polyfunctional isocyanates to give products which may be used for producing plasticizers, lubricants, plastics, spongy materials, gel formers, thickening agents, and the like. The patent describes the preparation of hydrogels and foams.

Subsequent studies with these poly(oxyalkylene) polyols demonstrated a high suitability for the preparation of hydrogels and foams having particular properties, as illustrated by the references described below.

U.S. Pat. No. 3,861,993 describes a composite foam scouring pad, one component of which is a hydrophilic foam composition prepared by reacting an isocyanate-capped poly(oxyethylene) polyol having an isocyanate functionality of at least two with an aqueous solution containing a blowing agent such as a polyisocyanate, a nonionic surfactant, and, when the isocyanate-capped poly(oxyethylene) polyol isocyanate functionality is about two, a crosslinking agent. The ratio of moles of water to moles of isocyanate functionality in the polyol can range from about 6.5 to about 390. The same hydrophilic foam is employed to prepare a laminated fabric as described in U.S. Pat. No. 3,874,964 and a horticultural foam structure as described in U.S. Pat. No. 3,889,417.

The reticulated crosslinked polyurethane foam described in U.S. Pat. No. 3,890,254 appears to differ from that described above in that particular types of surfactants are required and the isocyanate-capped poly(oxyethylene) polyol is derived from a poly(oxyethylene) polyol having a weight average molecular weight of from about 200 to about 20,000 and a hydroxy group functionality of from about 2 to about 8. See also U.S. Pat. No. 4,160,076.

Compressed foams which are restored to their original volume in the presence of water or heat are disclosed in U.S. Pat. No. 3,903,232; see also U.S. Pat. No. 3,854,535. The foams are similar to those described in U.S. Pat. No. 3,861,993. Briefly, a mixture of from 0 to about 97 percent by weight of an isocyanate-capped hydrophilic poly(oxyethylene) polyol having an isocyanate functionality of two and an isocyanate-capped poly(oxyethylene) polyol having an isocyanate functionality of from about 3 to about 8 and a weight average molecular weight of from about 200 to about 1,500 (20,000 according to claim 1) is reacted with water, optionally in the presence of a crosslinking agent. The ratio of moles of water to moles of isocyanate groups can range from about 6.5 to about 390. See also U.S. Pat. Nos. 4,156,592 and 4,292,412 which disclose the use of such foams in the preparation of expandable fabric softener-containing articles and hydrophilic fabric softener foam compositions, respectively. Similar foams are disclose in U.S. Pat. Nos. 4,110,508 and 4,137,200 in which the poly(oxyethylene) polyol moiety of the isocyanate-capped polyol has a weight average molecular weight of from about 200 to about 20,000. See also U.S. Pat. Nos. 4,201,846, 4,258,137, and 4,309,509 which describe the incorporation into the foam of U.S. Pat. No. 4,137,200 hydrophilic fibers prepared from vinyl alcohol homopolymers and copolymers, an epoxy resin, and an odorant, respectively. In addition, U.S. Pat. No. 4,127,516 describes the inclusion of a polyurea in the reaction mixture which yields the foams of U.S. Pat. No. 4,110,508. The polyurea is prepared by, for example, the reaction between a linear poly(oxyethylene) polyol which has been capped with a polyisocyanate and a polyamine in an organic solvent.

U.S. Pat. No. 3,904,557 describes a method for producing a multicolored polyurethane sponge. A poly(oxyethylene) polyol having a weight average molecular weight of from about 200 to about 20,000 and hydroxy functionality of from about 2 to about 8 is capped with a polyisocyanate. At least two distinctly different coloring agents are added to at least two different portions of isocyanate-capped polyol or water. The colored portions then are reacted with separate portions of water or isocyanate-capped polyol, respectively, to form separate colored foaming masses which then are mixed together under laminar flow conditions to yield a multicolored variegated polyurethane foam.

A polyurethane hydrogel is described in U.S. Pat. No. 4,118,354. The hydrogel is produced by dispersing into an aqueous liquid phase a product obtained by the reaction of a polyisocyanate having at least two isocyanate groups with a polyether. The polyether results from the polycondensation of at least two alkylene oxides with a polyalcohol having at least two hydroxy groups and has an average molecular weight per hydroxy group of from 1,000 to 4,000. Preferably, 75 to 85 percent of the alkylene oxides is ethylene oxide. The resulting hydrogel is stated to have a greater water content and to be highly elastic and highly stable, even in the presence of a corrosive electrolyte solution.

Urethane foams having low resiliency are described in U.S. Pat. No. 4,158,087. The foams are obtained by reacting a poly(oxyalkylene) urethane prepolymer containing at least 40 mole percent of oxyethylene units in the oxyalkylene portion of the prepolymer, water, and from about 40 to about 150 parts by weight on a solids basis per 100 parts by weight of the prepolymer of a synthetic polymer latex. The prepolymer is an isocyanate-capped poly(oxyethylene) polyol of the type described in U.S. Pat. Nos. 3,903,232 et seq.

U.S. Pat. No. 4,181,770 describes the preparation of a hydrophilic foam from an isocyanate-terminated branched polyethylene polyol, an isocyanate-terminated polyester prepolymer, a minor amount of a 4,4'-diphenylmethanediisocyanate/polycarbodiimide liquid condensation product which has 30 percent free isocyanate groups, and water. The foam is stated to have improved firmness and scuff resistance properties.

Isocyanate-capped urethane-containing prepolymers prepared from polyols obtained from an epihalohydrin are described in U.S. Pat. Nos. 4,273,913 and 4,297,482. The polyol can be, for example, a polyalkylene glycol composed of the same or different oxyalkylene units or a mixture of different polyalkylene glycols.

U.S. Pat. Nos. 4,314,034, 4,365,025, 4,377,645, 4,384,050, and 4,384,051 describe variations of a general concept which involves mixing a resin phase and an aqueous phase. The resin phase comprises an isocyanate-capped poly(oxyalkylene) glycol of the type described in U.S. Pat. Nos. 3,903,232 et seq. and diphenylmethane diisocyanate and/or polymeric forms or isocyanate-containing derivatives thereof.

Finally, mention should be made of U.S. Pat. Nos. 3,412,054 and 4,156,066. The first patent describes water-dilutable polyurethanes which are useful as surface coatings and printing inks. Such polyurethanes contain carboxylic acid groups which can be neutralized with ammonia or an amine. The carboxylic acid groups are provided by incorporating into the polyurethane a 2,2-bis(hydroxymethyl)-substituted carboxylic acid. Examples of suitable acids include 2,2-bis(hydroxymethyl)acetic acid, 2,2,2-tris(hydroxymethyl)acetic acid, 2,2-bis(hydroxymethyl)propionic acid, 2,2-bis(hydroxymethyl)butyric acid, 2,2-bis(hydroxymethyl)pentanoic acid, 2,2-bis(hydroxymethyl)butyric acid, 2,2-bis(hydroxymethyl)pentanoic acid, and the like. The polyurethanes are prepared by known techniques, such as adding organic dissocyanate to a mixture of a suitable carboxylic acid and a polyol polyurethane precursor.

The second patent, U.S. Pat. No. 4,156,066, discloses polyurethanes characterized by lactone groups and hydroxy groups in the polymer backbone. The polyurethanes are prepared by reacting an organic polyisocyanate with a poly(oxyalkylene) polyol and a polyfunctional lactone having excess hydroxy groups. The free hydroxy groups which are present in the formed polyurethane are available for crosslinking the polymer. The lactone groups can be hydrolyzed to form free carboxylic acid groups or carboxylate groups.

In addition to efforts directed at altering the nature of the polyurethane per se, as noted at length above, other efforts have been directed at either incorporating into the polyurethane foam a material which will give the desired property or preparing a foam of an entirely different type. Both of these approaches are illustrated by the references which are summarized in the paragraphs which follow.

U.S. Pat. No. 3,900,030 describes a polyurethane foam of approximately the same type as those disclosed in U.S. Pat. Nos. 3,903,232 et. seq. which has dispersed throughout the foam a particulate, water-swellable polymer containing a plurality of hydrophilic groups such as carboxy, carboxamide, sulfonate salt, or hydroxy groups. The particulate polymer is included to increase the water absorbency of the foam.

According to U.S. Pat. No. 4,377,160, a sheet or strip of a polyurethane foam is dipped first into a polyvinyl alcohol solution and then into a reactive gelling agent solution in order to gel the polyvinyl alcohol in the foam. The resulting gel-impregnated foam is useful as a cooling compression bandage.

Finally, U.S. Pat. No. 4,098,728 discloses foams prepared by the copolymerization of polyvinyl alcohol and formaldehyde. The foams are stated to be useful as surgical sponges. The patent notes deficiencies with polyurethane sponges which are related to the generally hydrophobic nature of polyurethanes. The patent also states that fast wicking and high liquid holding capacity are desirable qualities of surgical sponges, qualities which apparently are lacking in polyurethane sponges.

It is evident that the polyurethane foams of the prior art, while certainly admirable for many applications, suffer from various disadvantages for a number of uses. Many of these disadvantages are associated with the generally hydrophobic nature of polyurethanes. Consequently, in spite of the prior art efforts to prepare superabsorbent foams, there still is a need for improvements with regard to such materials.

SUMMARY OF THE INVENTION

Consequently, it is an object of the present invention to provide a superabsorbent polyurethane foam.

It also is an object of the present invention to provide a superabsorbent polyurethane foam which is based on an interpenetrating polymer network.

It also is an object of the present invention to provide a superabsorbent polyurethane foam which is prepared from an isocyanate-terminated poly(oxyalkylene) polyol.

It is a further object of the present invention to provide a superabsorbent polyurethane foam prepared from an isocyanate-terminated poly(oxyalkylene) polyol, which foam is based on an interpenetrating polymer network.

Still another object of the present invention is to provide a superabsorbent polyurethane foam prepared from an isocyanate-terminated poly(oxyalkylene) polyol, which foam is based on an interpenetrating polymer network of crosslinked polyurethane and crosslinked addition polymer having a plurality of carbamoyl, substituted carbamoyl, or carboxy groups or alkali metal or ammonium salts thereof.

These and other objects will be readily apparent to those having ordinary skill in the art from a reading of the specification and claims which follow.

Accordingly, the present invention provides a superabsorbent polyurethane foam which comprises an interpenetrating polymer network of a crosslinked polyurethane and a crosslinked addition polymer which contains a plurality of chain segments comprised of functional group-containing repeating units which may be the same or different, said functional groups being selected from the group consisting of carbamoyl, substituted carbamoyl, and carboxy and alkali metal and ammonium salts thereof, the number of repeating units per chain segment being in the range of from about 10 to about 300, the superabsorbent polyurethane foam being essentially free of grafting of addition polymer to polyurethane.

In preferred embodiments, the polyurethane is derived from an isocyanate-terminated poly(oxyalkylene) polyol having an isocyanate functionality greater than two and the addition polymer is the reaction product of a crosslinking agent with at least one compound selected from the group consisting of acrylamides, substituted acrylamides, and acrylate and methacrylate salts, i.e., alkali metal and ammonium salts of acrylic and methacrylic acid.

The present invention also provides a method of preparing a superabsorbent polyurethane foam which comprises mixing an isocyanate-terminated polyurethane prepolymer having an isocyanate functionality greater than two with an aqueous solution of at least one first compound in the presence of at least one thermally activated free radical initiator and at least one second compound, said first compound having (1) at least one carbon-carbon double bond capable of undergoing addition polymerization with at least one second compound and with itself and other first compounds which may be present and (2) at least one functional group selected from the group consisting of carbamoyl, substituted carbamoyl, and carboxy and the alkali metal and ammonium salts thereof; said second compound having at least two carbon-carbon double bonds which are capable of undergoing addition polymerization with said first compound; the proportions of said first and second compounds are selected to impart superabsorbent properties to the resulting polyurethane foam; and the resulting polyurethane foam is essentially free of grafting of addition polymer to polyurethane.

In preferred embodiments, said first compound is selected from a first group consisting of acrylamides, methacrylamides, and alkali metal and ammonium salts of acrylic and methacrylic acid. In additional preferred embodiments said first compound is selected from the group consisting of acrylamide, methacrylamide, potassium acrylate, and potassium methacrylate. In other preferred embodiments, said second compound is selected from a second group of compounds which are polyamides and polyesters of aliphatic diamines and diols, respectively, with acrylic and methacrylic acid. In still other preferred embodiments, said second compound is selected from a second group of compounds which are polyamides and polyesters of aliphatic diamines and dials, respectively, with acrylic and methacrylic acid. In still other preferred embodiments, said second compound is selected from the group consisting of methylene-bis-acrylamide and 1,6-hexanediol diacrylate. In yet other preferred embodiments, the prepolymer is an isocyanate-terminated poly(oxyalkylene) polyol.

DETAILED DESCRIPTION OF THE INVENTION

The term "ammonium" is used herein to mean any quaternary ammonium ion derived from ammonia or primary, secondary, or tertiary amines. The choice of such amines is limited only to the extent that any given amine significantly adversely affects foam properties.

For convenience, the term "precursor" will be used herein to mean a polyfunctional polurethane precursor which is reacted with a polyisocyanate to give an isocyanate-terminated material, whereas the term "prepolymer" will refer to the isocyanate-terminated material. Furthermore, each term is intended to include both a single compound or material and a mixture of two or more compounds or materials.

The phrase "at least one first compound," at least one second compound," and the like are intended to include the use of a single compound or a mixture of two or more compounds. For convenience, however, the use hereinafter of such terms as "first compound," "second compound," and the like shall be read as encompassing both single compounds and mixtures of two or more compounds.

The nature of the polyurethane is not known to be critical. Thus, the polyurethane can contain other moieties, such as polyesters, polyethers, and the like. However, the polyurethane must be crosslinked, as will be made more clear hereinafter, in order to assure foam integrity. Because of the wide variety of polyurethanes which can be prepared within the spirit and scope of the present invention, it is not practical to define precise ranges for the degree of crosslinking which will result in suitable foams. However, one having ordinary skill in the art can readily prepare foams coming within the scope of the present invention, without the need for undue experimentation, by the following guidelines contained herein.

Stated differently, the precursor can be any of the precursors known to those having ordinary skill in the art for the preparation of polyurethane foams. Because the foam must be crosslinked, the precursor should have at least two isocyanate-reactive groups per molecule (referred to hereinafter as precursor isocyanate-reactive functionality, or PICRF). The isocyanate-reactive groups can be the same or different and can be any of the groups known to be reactive with an isocyanate. Such groups include primary aliphatic amines, secondary aliphatic amines, primary aromatic amines, secondary aromatic amines, hydrazines, amides, ureas, urethanes, imides, amidines, nitramines, diazoamino compounds, phenylhydrazones, aminooximes, sulfimides, acylureas, thioureas, isothioureas, primary alcohols, secondary alcohols, phenols, carboxylic acids, malonic esters, nitroalkanes, acetoacetic esters, primary mercaptans, secondary mercaptans, thiophenols, and the like. For a review of groups which are reactive with isocyanates, see J. H. Saunders and K. C. Frisch, "Polyurethanes: Chemistry and Technology. Part I. Chemistry," Vol. XVI, Part I, Interscience Publishers, New York, 1962, pp. 63–128.

The preferred isocyanate-reactive groups are primary and secondary alcohols, primary and secondary amines, and primary and secondary mercaptans. The more preferred groups are primary alcohols and amines, with primary alcohols being most preferred.

As a practical matter, polyurethane foams prepared from a poly(oxylakylene) polyol are preferred, largely because of the water miscibility and ready commercial availability of such polyol and the generally acceptable properties of the resulting foams. Especially useful are the isocyanate-terminated polyurethane prepolymers which are based on such polyols, such as HYPOL ® prepolymers available from W. R. Grace & Co., Organic Chemicals Division, Lexington, Mass.

As used herein, the terms "poly(oxyalkylene) glycol" and "poly(oxyalkylene) polyol" are intended to be synonymous and to include any poly(oxyalkylene) condensation product containing at least two hydroxy groups. Moreover, such materials may be considered to be derived from one or more alkylene oxides. Thus, the oxyalkylene moiety can be all of one type or mixture of two or more types. A mixture may be either random or block. In addition, such materials can contain other moieties, such as polyesters, polyamides, and the like, as already indicated.

Because the preparation of prepolymers is well known in the art and prepolymers are commercially available, the reaction by which the prepolymers are formed is not deemed to form a part of the method of the present invention. Nevertheless, some discussion regarding the relationships between the functionality of the precursor and the functionality of the prepolymer perhaps is appropriate.

As already noted, the PICRF should be at least two. When the PICRF is two, crosslinking of the polyurethane during the foam-forming reaction can be achieved by using either a polyisocyanate having at least three isocyanate groups per molecule or a mixture of a diisocyanate and one or more polyisocyanates having at least three isocyanate groups per molecule. Alternatively, or in addition, a separate crosslinking agent can be added, as is well known to those having ordinary skill in the art. When the PICRF is three or more, crosslinking can be controlled by adding one or more compounds having but one isocyanate-reactive group.

Usually, and preferably, the PICRF will be between two and three. This is achieved, as is well known in the art, by employing a mixture of two or more precursors, one of which has a PICRF of two and one of which has a PICRF of three or more. The ratio of the amounts of precursors present and the PICRF values of each determine the average PICRF value for the mixture.

It should be noted, however, that crosslinking still can be achieved when the PICRF is less than two by preparing the prepolymer with an isocyanate having three or more isocyanate groups per molecule. Such a procedure will yield a prepolymer having a prepolymer isocyanate functionality (or PPICF) greater than two. However, a PICRF of less than two requires the presence of precursor molecules having but one isocyanate-reactive group. Such molecules are chain terminating and, as a consequence, can have deleterious effects on polyurethane properties. Such effects may be sufficiently minor when the precursor molecular weight is relatively high. Accordingly, the present invention is deemed to include the use of precursors having a PICRF of less than two, provided that acceptable superabsorbent polyurethane foams can be prepared therewith.

The prepolymer isocyanate functionality (or PPICF) clearly is affected by the PICRF. If a diisocyanate is used to prepare the prepolymer, the PPICF and the PICRF will be the same. However, the PPICF can be either lower or higher than the PICRF by using an appropriate mixture of isocyanates. For example, the use of a mixture of a monoisocyanate and a diisocyanate will reduce the PPICF relative to the PICFR, the extent of such reduction being a function of the amount of monoisocyanate present. Alternatively, a mixture of a diisocyanate and a triisocyanate (or any polyisocyanate having at least three isocyanate groups per molecule) will increase the PPICF relative to the PICRF, the extent of such increase being a function of the amount of triisocyanate (or polyisocyanate) present. As already indicated, however, the PPICF must be greater than two. Preferably, the PPICF will be equal to or greater than about 2.3.

As already stated, the superabsorbent polyurethane foam of the present invention is prepared by mixing an isocyanate-terminated polyurethane prepolymer having an isocyanate functionality greater than two with an aqueous solution of at least one first compound in the presence of a thermally activated free radical initiator and at least one second compound.

Said first compound must have (1) at least one carbon-carbon double bond capable of undergoing addition polymerization with the second compound and with itself and other first compounds which may be present and (2) at least one functional group selected from the group consisting of carbamoyl, substituted carbamoyl, and carboxy and the alkali metal and ammonium salts thereof.

In general, said first compound is selected from the group consisting of carboxylic acid amides in which the amido moiety can be substituted or unsubstituted, i.e., carbamoyl and substituted carbamoyl, and carboxylic acids and alkali metal and ammonium salts thereof, which compounds have at least one carbon-carbon double bond capable of undergoing addition polymerization with the second compound and with itself.

Said first compound can contain more than one functional group as long as there is present in the compound at least one carbamoyl, substituted carbamoyl, or carboxy group or alkali metal or ammonium salt thereof and the additional functional groups do not react with isocyanate groups in aqueous media and do not significantly adversely affect either the polymerization reactions or the properties of the resulting foam. Thus, when two or more functional groups are present in any first compound, such groups can be the same or different. Moreover, all functional groups present in the compound can be selected from the foregoing group of required functionality, if desired. When all of the functional groups are carboxy groups, such groups can be present partly as the free acid and partly as a salt.

By way of illustration only, suitable first compounds include, among others, acrylic acid, methacrylic acid, 2-butenoic acid, 4-chloro-2-butenoic acid, 3-butenoic acid, 5-allyl-3-methoxybenzoic acid, cinnamic acid, 2-carboxycinnamic acid, 4-carboxycinnamic acid, 1-cyclohexenylcyanoacetic acid, cyclohexene-1-carboxylic acid, fumaric acid, chlorofumaric acid, mesaconic acid, 2,4-hexadienedio acid, 3-hexenoic acid, itaconic acid, linoleic acid, maleic acid, allylmalonic acid, 4-methyl-2-pentenoic acid, allylacetic acid, propenoic acid, the amides thereof, the substituted amides thereof, the alkali metal salts thereof, the ammonium salts thereof, and the like. Among the ammonium salts, those derived from ammonia and the primary lower alkyl amines are preferred, with those derived from ammonia being most preferred. The preferred compounds are acrylic acid, methacrylic acid, acrylamide, methacrylamide, and the sodium and potassium salts of acrylic and methacrylic acid. Acrylamide and the potassium salts of acrylic and methacrylic acid are the most preferred first compounds.

In selecting the first compound, it is preferred that the reactivity of the double bond thereof in addition polymerization reactions be approximately the same as that of the double bonds of the second compound. If such reactivity of the double bond of the first compound is significantly greater than that of the double bonds of the second compound, there is an increased possibility that the first compound preferentially will polymerize with itself (or copolymerize with other first compounds present in the reaction mixture). If this happens, the degree of interpenetration of the addition polymer with the polyurethane may not be sufficient to prevent leaching of the addition polymer from the polyurethane foam. Such leaching is undesirable for applications where relatively permanent superabsorbency is required, i.e., when extraction of the addition polymer is to be avoided.

The amount of first compound employed is in part dependent upon the degree of superabsorbency desired and the solubility of first compound in water. Generally, the amount of first compound present in the aqueous solution will be in the range of from about 10 to about 300 moles per mole of second compound present in the prepolymer mixture. The lower limit is the approximate minimum required to give a superabsorbent polyurethane foam in which the polyurethane and the addition polymer exhibit substantial interpenetrating polymer network characteristics. The upper limit, however, is more a function of first compound solubility than anything else. Thus, if an extremely water-soluble first compound were employed, the upper limit could be greater.

It should be appreciated by those having ordinary skill in the art that the above limits are given by way of suggestion only. Because the degree of superabsorbency achieved with any polyurethane foam will be primarily a function of the number and types of functional groups present in the addition polymer, the number or chain lengths of the addition polymer molecules should not be critical, provided that the chain lengths are sufficient to yield an interpenetrating polymer network. Thus, the degree of superabsorbency normally will not be a function of the amount of second compound present in the modified prepolymer.

Preferably, the amount of first compound in the aqueous solution will be in the range of from about 20 to about 200, and most preferably from about 30 to about 100, moles per moles of second compound in the reaction mixture.

The lower limit of the broad range given above is approximately equivalent to about $1 \times 10^{-3}$ mole of first compound in the aqueous solution per g of prepolymer. Preferably, such amount will be at least about $2 \times 20^{-3}$, and most preferably at least about $3 \times 20^{-3}$, mole per g of prepolymer. It must be emphasized, though, that these values are given by way of illustration only, in part because the superabsorbency obtained with any given first compound is affected by the nature of the precursor.

In view of the foregoing discussion, it should be apparent that the amount of first compound on a weight basis can vary widely. By way of illustration only, such amount usually will be in the range of from about 20 to about 80 percent by weight, based on the weight of prepolymer, and often will be in the range of from about 30 to about 65 percent by weight.

As already stated, said second compound must have at least two carbon-carbon double bonds which are capable of undergoing addition polymerization with said first compound. In general, the second compound can be any compound which (1) has at least two carbon-carbon double bonds, (2) is compatible with the prepolymer, (3) does not possess functional groups which will have a significantly adverse effect on either the foaming reaction or the properties of the foam, and (4) will not react with an isocyanate group in aqueous media. The carbon-carbon double bonds must be capable of undergoing addition polymerization with other second compound molecules and with first compounds.

Examples of suitable second compounds include, by way of illustration only, allyl acrylate, allyl methacrylate, vinyl acrylate, vinyl methacrylate, 2-cyclohexenyl acrylate, N-vinylacrylamide, N-allylmethacrylamide, methylene-bis-acrylamide, diallyl 1,6-hexanedioate, allene, allyl ether, allyl vinyl ether, allyl sulfide, allyl sulfoxide, 1,2-divinylbenzene, 1,3-divinyl-benzene, 1,4-divinylbenzene, 4,4'-divinylbiphenyl, methylallene, 4-bromo-1,2-butadiene, 4-methoxy-1,2-butadiene, 1,3-butadiene, 1-chloro-2-methyl-1,3-butadiene, 2-chloro-1,3-butadiene (chloroprene), 2,3-dimethyl-1,3-butadiene, 1,4-diphenyl-1,3-butadiene 1-ethoxybutadiene, hexachloro-1,3-butadiene, 2-methyl-1,3-butadiene (isoprene), 1,2,3-trichloro-1,3-butadiene, 1,2-butanediol dimethacrylate, 1,3-butanediol diacrylate, 1,4-butanediol diacrylate, 2,3-butanediol dimethacrylate, 2,3-dimethyl-2,3-butanediol diacrylate, 3-methyl-1,2-butanediol dimethacrylate, 1,2-bis(allyloxy)butane, 1,4-bis(vinyloxy)butane, tetravinyl 1,2,3,4-butanetetracarboxylate, 1,2,3-butanetriol triacrylate, 2-butene-1,4-diol dimethacrylate, allyl 2-butenoate, vinyl 3-chloro-2-butenoate, allyl 2-methyl-2-butenoate, ethyl 2-acryloyloxy-3-butenoate, 2-butene-1-ol methacrylate, 4-chloro-2-butene-1-ol methacrylate, 3-butene-1-ol acrylate, vinyl cinnamate, allyl cinnamate, diallyl 2-carboxycinnamate, methyl 2,4-bis(acryloyloxy)cinnamate, vinyl 3,5-bis(methacryloyloxy)cinnamate, allyl 2-acryloyloxycinnamate, 3-(4-hydroxyphenyl)-2-propene-1-ol diacrylate, 1,6-cyclodecanediol dimethacrylate, 1,3,5-cycloheptatriene, 1,3-cyclohexadiene, 1,4-cyclohexadiene, divinyl 2,6-cyclohexadiene-1,2-dicarboxylate, 3-(acryloyloxmethyl)cyclohexene, 2allylcyclohexanol methacrylate, diallyl 1,4-cyclohexanedicarboxylate, 1,2-cyclohexanediol diacrylate, 1-vinylcyclohexene, 4-vinylcyclohexene, vinyl 3-cyclohexene-1-carboxylate, diallyl 2-cyclohexene-1,2-dicarboxylate, 2-cyclohexene-1-ol methacrylate, 1,3-cylcopentadiene, divinyl 1,3-cyclopentanedicarboxylate, 1,3-decadiene, diallyl 2,4-decadienoate, 1,10-decanediol dimethacrylate, diallyl dodecanedioate, ethylene glycol diacrylate, ethylene glycol dimethacrylate, ethylene glycol divinyl ether, diallyl glutarate, divinyl 2-(acryloyloxy)glutarate, allyl 2,3-bis(methacryloyloxy)propionate, ethyl 2,3-bis(aryloyloxy)propionate, glycerol triacrylate, 1,5-heptadiene, 1,5-heptatriene-4-01 acetate, 1,5-heptadiene-4-ol methacrylate, 4-methyl-4-heptene-4-ol acrylate, divinyl hexadecanedioate, 2,4-hexadiene, 3,5-hexadiene-2-ol methacrylate, 1,6-hexanediol diacrylate, 1,6-hexanediol dimethacrylate, 2,6-hexanediol diacrylate, allyl methacryloyloxyacetate, vinyl 3-(acryloyloxy)benzoate, allyl 2-chloro-4-(methacryloyloxy) benzoate, divinyl maleate, 2-methyl-2-propene-1-ol methacrylate, 2,6-octadiene, 7-methyl-2,6-octadiene, 1,7-octadiene, diallyl octadioate, 1,4-pentadiene, 1,5-pentanediol diacrylate, 2,2-dimethyl-1,3-pentanediol diacrylate, 2-allylphenyl vinyl ether, divinyl phthalate, 1,3-propanediol dimethacrylate, 1,2-propanediol diacrylate, 2,2'-bis(methacryloyloxy)stilbene, diallyl terephthalate, and the like.

The preferred second compounds are those which may be considered to be derived from acrylic and methacrylic acid. Such preferred compounds include acrylamides, methacrylamides, and esters of acrylic and methacrylic acid with aliphatic polyols. Two of the preferred compounds were used in the examples, namely, methylene-bis-acrylamide and 1,6-hexanediol diacrylate.

The amount of second compound is not known to be critical, provided that such amount and the amount of said first compound are chosen to give the desired superabsorbent properties to the resulting polyurethane foam. As a practical matter, the amount of second compound employed typically will be in the range of from about 1 to about 5 percent by weight, based on the amount of prepolymer.

In general, the second compound can be added to either th prepolymer or the aqueous solution of first compound. The choice of phase appears to be primarily a function of second compound solubility characteristics and convenience.

The mixing of prepolymer and the aqueous solution of first compound must take place in the presence of a thermally activated free radical initiator. As with the second compound, the initiator also can be dissolved in either the prepolymer or the aqueous solution in which the first compound is dissolved. The choice of phase does not appear to be critical and is primarily a function of initiator solubility.

In general, the free radical initiator can be any of the known initiators for free radical addition polymerization. Examples of such initiators include, by way of illustration only, acyl peroxides, such as acetyl peroxide, benzoyl peroxide, bromobenzoyl peroxide, and the like; alkyl peroxides, such as cumyl peroxide, t-butyl peroxide, lauryl peroxide, and the like; hydroperoxides, such as t-butyl hydroperoxide, cumyl hydroperoxide, and the like; peresters, such as t-butyl perbenzoate, t-butyl peracetate, and the like; azo compounds, such as 2,2′-azobisisobutyronitrile, p-bromobenzenediazo hydroxide, triphenylmethylazobenzene, and the like; disulfides; tetrazenes; tetraphenylsuccinonitrile; hydrogen peroxide and ferrous ions; potassium peroxysulfate; ammonium peroxysulfate; and the like.

Because satisfactory results have been achieved with the use of 2,2′-azobisisobutyronitrile and ammonium peroxysulfate, such compounds are preferred. Ammonium peroxysulfate can be used in the presence of N,N,N′,N′-tetramethylethylene diamine which causes a lowering of the activation temperature of the ammonium peroxysulfate to a temperature within the range of the exotherm produced by the foaming reaction. The combination of ammonium peroxysulfate with N,N,N′N′-tetramethylethylene diamine is most preferred since it results in simultaneous foaming and addition polymerization reactions. Of course, other low temperature activated initiators can be used. However, the addition polymerization reaction can be carried out either during or after the foaming reaction.

If desired, more than one free radical initiator can be employed. For example, one initiator could have a relatively low activation temperature and a second initiator could have a higher activation temperature. The first initiator would be activated early in the foaming process, whereas the second initiator would be activated later, such as during a post-foaming polymerization step.

The amount of initiator employed is not known to be critical, provided that the amount is sufficient to initiate the addition polymerization. Typically, the amount of initiator will be in the range of from about 0.5 to about 5 percent by weight, based on the amount of first compound present in the aqueous solution. Preferably, the amount of initiator will be in the range of from about 1 to about 3 percent by weight.

The conditions of mixing are not known to be critical. In general, such mixing will be carried out at ambient temperature, although lower or higher temperatures can be employed, if desired. Higher temperatures may be desirable in order to reduce the viscosity of the prepolymer as an aid to mixing.

Although the use of a solvent usually is not necessary, one or more solvents may be employed if desired. For example, the use of a solvent may be appropriate if the second compound is water-insoluble and difficult to dissolve in the prepolymer. Alternatively, the use of a solvent may be convenient if the viscosity of the prepolymer is too high to allow satisfactory mixing.

In general, any solvent can be used which is not reactive with any of the components of the reaction mixture and in which the reactants are sufficiently soluble. Examples of suitable solvents include, by way of illustration only, aliphatic ketones, such as acetone, methyl ethyl ketone, methyl propyl kentone, and the like; aliphatic esters of the lower aliphatic carboxylic acids, such as ethyl acetate, methyl propionate, butyl acetate, and the like; aliphatic ethers, such as diethyl ether, methyl propyl ether, and the like; aromatic hydrocarbons, such as benzene, toluene, the xylenes, and the like; halogenated aliphatic hydrocarbons, such as methylene chloride and the like; dioxane; tetrahydrofuran; dimethylformamide; and the like. The amount of solvent used is not known to be critical.

If a solvent has been used to dissolve the second compound in the prepolymer prior to mixing, it may be desirable to remove it, usually under reduced pressure, in order to avoid the presence of solvent in the superabsorbent polyurethane foam. It is not imperative that solvent be removed, however, especially if a relatively small amount of a relatively volatile solvent has been employed. Preferably, a substantial amount of solvent will not be present in the mixture.

Because the foaming reaction is exothermic, the mixing typically is carried out at ambient temperature, although lower or higher temperatures can be used. If the free radical initiator is activated at a sufficiently low temperature, the exotherm activates the free radical initiator which in turn causes the free radical polymerization of the first compound with the second compound and with itself. If the exotherm is insufficient to activate the free radical initiator, the foam can be heated at a temperature which will cause activation of the initiator and for a period of time sufficient to allow the addition polymerization to take place. Thus, as already noted, the addition polymerization can be carried out simultaneously with or subsequent to the polyurethane foam formation reaction.

The addition polymer thus obtained comprises chain segments comprised of repeating units which can be represented by the following general formula:

in which each of $R_1$, $R_2$, . . . and $R_n$ independently represents a divalent hydrocarbon group which may be substituted or unsubstituted; each of $X_1$, $X_2$, . . . and $X_n$ independently represent carbamoyl, substituted carbamoyl, or carboxy or an alkali metal or ammonium salt thereof; n is an integer which represents the number of different repeating units; and each of a, b, . . . and z represents an integer of from 0 to about 300, with the proviso that the sum of a, b, . . . and z is in the range of from about 10 to about 300.

It should be noted that the formula represents chain segments and not the entire addition polymer. As already discussed in detail, a portion of the polymer consists of the second compound (i.e., the addition polymer crosslinking agent) which also is present in the reaction mixture. In addition, the chain segments can contain other addition polymerizable compounds which do not possess any of the functional groups specified herein for imparting superabsorbance to the foam. The incorporation of such compounds in the chain segments is not preferred, but is deemed to come within the spirit and scope of the present invention; for simplicity, however, the presence of such compounds is not specifically provided for by the formula. Moreover, the formula is somewhat idealized in that a purely block copolymer rarely will be realized under the conditions of the addition polymerization reaction. Thus, the formula is used herein with the understanding that random copolymers also are covered thereby; indeed, it is intended that such formula cover any addition polymer prepared from any combination of first compounds which meets the description set forth hereinbefore.

For preferred embodiments, formula (1) can be rewritten as follows:

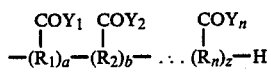  (2)

in which $R_1, R_2, \ldots R_n$, a, b, . . . z, and n are as defined as in formula (1); each of $Y_1$, and $Y_2, \ldots Y_n$ independently represents amino, substituted amino, or $-OM_1$, $-OM_2, \ldots$ and $M_n$, respectively; and each of $M_1$, and $M_2, \ldots$ and $M_n$ independently represents hydrogen, an alkali metal, or an ammonium ion.

The present invention is further illustrated by the examples which follow. Such examples, however, are not to be construed as in any way limiting the spirit and scope of the present invention. In the examples, all temperatures are in degrees Celsius, unless specified otherwise.

EXAMPLE 1

A 1-qt. (0.95 l) stainless steel mixing cup was charged with 150 g of a toluene diisocyanate-terminated poly(oxyethylene) polyol having a molecular weight of 1,400, a PPICF of 2.3, and a free toleune diisocyanate content of 0.3 percent by weight (HYPOL ® FHP 2002, W. R. Grace & Co., Organic Chemicals Division, Lexington, Mass.). To the mixing cup was added an aqueous solution of 47 g of acrylamide, 3 g of methylene-bis-acrylamide, and 0.4 g of ammonium peroxysulfate in 100 g of deionized water, followed by the immediate addition of 0.5 ml of N,N,N',N'tetramethylethylene diamine. The contents of the mixing cup were mixed immediately for about 2 sec under high shear using a Hamilton Beach Model 936 Drink Mixer (Scovil, Inc., Hamilton Beach Division, Waterbury, Conn.). The resultant foaming mixture was poured into a Teflon-coated pan and covered. An exotherm, accompanied by steam generation, was observed. The foam was air dried and stored in a sealed polyethylene bag.

A control foam was prepared by repeating the above procedure, except that the acrylamide, methylene-bis-acrylamide, and free radical initiator were omitted; the amount of water employed to generate the foam was 150 g.

A Saline Retention Value/100 (SRV/100) was determined for the foam of Example 1 and the control foam. Such SRVs/100 were 1.82±0.04 and 0.97±0.03, respectively. The SRV/100 was determined as described in ASTM Test Method D 2402, Standard Test Method for Water Retention of Fibers (Centrifuge Method), except that 0.09 percent by weight acqeous sodium chloride was used in place of water. The foam of Example 1 was stiff or rigid when dry, but in the presence of water it became swollen, flexible, and gel-like.

EXAMPLE 2

A 1-qt. (0.95 l) stainless steel mixing cup was charged with 150 g of the prepolymer of Example 1, 1.1 g of 2,2'-azobisisobutyronitrile dissolved in 5.0 g of dry acetone, and 3.0 g of 1,6-hexanediol diacrylate. The contents of the mixing cup were stirred slowly to obtain a homogenous mixture. To the resulting mixture was added 147 g of 55 percent by weight aqueous solution of potassium acrylate, followed immediately by the high-shear mixing described in Example 1, except that the mixing time was increased to about 5 sec. The foaming reaction mixture was poured into a Teflon-coated pan and allowed to stand for about 15 min. The foam then was placed in an oven for one hour at 100° under an inert atmosphere.

The resulting foam was soft and flexible and hydrated rapidly upon exposure to water to become swollen and gel-like. The foam had an SRV/100 of 4.15±0.17.

EXAMPLE 3

A 1-qt. (0.95 l) stainless steel mixing cup was charged with 188 g of the prepolymer of Example 1 and 4.0 g of 1,6-hexanediol diacrylate. The contents of the mixing cup water were stirred slowly until homogenous. The mixing cup then was charged with a solution of 0.5 g of N,N,N',N'-tetramethylethylene diamine in 184 g of 55 percent by weight aqueous potassium acrylate and a solution of 0.45 g of ammonium peroxysulfate in 5.0 g of water. The contents of the mixing cup were mixed and the resulting foam was molded, both as described in Example 1. The resulting foam was dried in a vacuum oven and sealed in a polyethylene bag.

The foam thus obtained was soft and flexible and became very highly swollen and gel-like upon exposure to water. The foam demonstrated rapid fluid uptake and gave an SRV/100 of 6.50±0.07.

EXAMPLE 4

The procedure of Example 1 was repeated, except that the aqueous solution consisted of 27.0 g of acrylamide and 3.0 g of methylene-bis-acrylamide dissolved in 120 g of 55 percent aqueous potassium acrylate, to which had been added 1.0 g of a solution prepared by dissolving 4.0 g of ammonium peroxysulfate in 6.8 g of deionized water, and the resulting foam was dried in a vacuum oven at 50° and 20 mm Hg.

The foam was rather hard and stiff, but it became highly swollen and gel-like upon exposure to water. The wicking rate did not appear to be as rapid as that observed with the foam of Example 3. The foam had an SRV/100 of 4.02±0.07.

Having thus described the invention, numerous changes and modifications thereto will be apparent to those having ordinary skill in the art without departing from the spirit and scope of the present invention.

What is claimed is:

1. A method of preparing a superabsorbent polyurethane foam which comprises mixing an isocyanate-terminated polyurethane prepolymer having an isocyanate functionality greater than two with an aqueous solution of at least one first compound in the presence of at least one thermally activated free radical initiator and at least one second compound, said at least one first compound having (1) at least one carbon-carbon double bond capable of undergoing addition polymerization with the at least one second compound and with itself and other first compounds which may be present and (2) at least one functional group selected from the group consisting of carbamoyl, substituted carbamoyl, and carboxy and the alkali metal and ammonium salts thereof; said second compound having at least two carbon-carbon double bonds which are capable of undergoing addition polymerization with said at least one first compound; the proportion of said first and second compounds are selected to impart superabsorbent properties to the resulting polyurethane foam; and the resulting polyurethane foam is essentially free of grafting of addition polymer to polyurethane.

2. The method of claim 1, in which said polyurethane prepolymer is an isocyanate-terminated poly(oxyalkylene) polyol.

3. The method of claim 2, in which said polyurethane prepolymer has an isocyanate functionality equal to or greater than about 2.3.

4. The method of claim 1, in which said at least one first compound is selected from the group consisting of amides, alkali metal salts, and ammonium salts of acrylic and methacrylic acid.

5. The method of claim 4, in which said at least one first compound is selected from the group consisting of acrylamide and potassium acrylate.

6. The method of claim 1, in which said at least one second compound is selected from the group consisting of acyrlamides, methacrylamides, and esters of acrylic and methacrylic acid with aliphatic polyols.

7. The method of claim 6, in which said at least one second compound is selected from the group consisting of methylene-bis-acrylamide and 1,6-hexanediol diacrylate.

* * * * *